United States Patent [19]
Immendorfer et al.

[11] Patent Number: 4,763,350
[45] Date of Patent: Aug. 9, 1988

[54] FACILITY FOR DETECTING AND CONVERTING DIAL INFORMATION AND CONTROL INFORMATION FOR SERVICE FEATURES OF A TELEPHONE SWITCHING SYSTEM

[75] Inventors: Manfred Immendorfer, Ditzingen; Dieter Kopp, Hemmingen; Gebhard Thierer, Ditzingen; Helmut Seichter, Pfullingen, all of Fed. Rep. of Germany

[73] Assignee: Alcatel, N.V., Amsterdam, Netherlands

[21] Appl. No.: 744,343

[22] Filed: Jun. 13, 1985

[30] Foreign Application Priority Data
Jun. 16, 1984 [DE] Fed. Rep. of Germany ....... 3422409

[51] Int. Cl.[4] .................. H04M 1/50; H04M 3/42; H04Q 1/50; H04Q 3/04
[52] U.S. Cl. .................. 379/67; 379/201; 379/216; 379/282
[58] Field of Search ............ 370/61, 62; 379/216, 379/89, 52, 157, 88, 67, 84, 201, 211, 282, 283

[56] References Cited
U.S. PATENT DOCUMENTS
Re. 32,012 10/1985 Pirz et al. .................. 381/43
4,554,418 11/1985 Toy .......................... 379/88

FOREIGN PATENT DOCUMENTS
3229637 2/1984 Fed. Rep. of Germany ........ 379/89
3229659 2/1984 Fed. Rep. of Germany ........ 379/89
3236272 4/1984 Fed. Rep. of Germany ...... 379/216
0206164 12/1982 Japan ......................... 379/89
0086357 5/1984 Japan ......................... 379/89
0125196 7/1984 Japan ......................... 379/89

OTHER PUBLICATIONS

"Application of Speech Recognition and Synthesis to PABX Services", H. Mulla et al., *Electrical Communication*, (ITT), vol. 59, No. 3, May 6, 1985, pp. 273–280.

*Primary Examiner*—Thomas W. Brown
*Attorney, Agent, or Firm*—Spencer & Frank

[57] ABSTRACT

In a telephone switching system, a multifrequency code receiver unit is replaced by a voice-controlled dial signal receiver unit connected to the switching network via an adapter unit. The voice-controlled dial signal receiver unit contains a voice recognition unit, a voice output unit, and a control unit. A multifrequency code receiver is connected in parallel with the voice-controlled dial signal receiver unit and coupled to the adapter unit. The subscriber can enter dial information and service-feature-control information through the microphone of the handset of a telephone station and/or through a numeric keypad of the station. Instead of being informed of the respective line condition by tone signals, the subscriber receives this information in the form of speech from the voice output unit.

4 Claims, 2 Drawing Sheets

FACILITY FOR DETECTING AND CONVERTING DIAL INFORMATION AND CONTROL INFORMATION FOR SERVICE FEATURES OF A TELEPHONE SWITCHING SYSTEM

BACKGROUND OF THE INVENTION

The present invention relates to a facility for detecting and converting dial information and control information for service features of a telephone switching system.

In telephone switching systems, desired numbers can be entered either by means of rotary dials or through numeric keypads.

The following assumes that modern numeric keypad and multifrequency signalling are used in the system.

When the handset of a telephone station is removed, the station is connected to a multifrequency code receiver through a line circuit and a switching network. The sequence of digits of a desired number or for a service feature of the telephone switching system, entered through the numeric keypad, is detected in the multifrequency code receiver, converted into corresponding control signals, and transmitted to a switching control unit of the telephone switching system for further establishment of the connection.

Although the subscriber can rapidly enter even long numbers, call up numbers stored in the abbreviated-dialling facility, or activate service features, such as call forwarding or "camp-on busy" in a private branch exchange, there is the big disadvantage that he can use these services only by entering a large number of different sequences of digits.

The subscriber is thus compelled to either remember those sequences of digits or look them up in a list. In addition, in a conventional telephone switching system, he must be able to distinguish between many different tones, such as busy tone, ringing tone, etc.

SUMMARY OF THE INVENTION

The technical problem to be solved by the invention is to provide a facility for detecting and converting dial information and control information for service features of a telephone switching system.

The invention is characterized in that the facility contains a voice-controlled dial signal receiver unit, that the voice-controlled dial signal receiver unit includes a voice recognition unit and a control unit, that the voice recognition unit and the control unit are connected to an adapter unit by a first message path and a second message path, respectively, that the adapter unit provides the interface to a switching network of the telephone switching system, and that a multifrequency code receiver is connected to the control unit and, in parallel with the voice-controlled dial signal receiver unit by the first message path, to the adapter unit.

An advantage of the facility according to the invention lies in the fact that the subscriber can enter dial information or activate service features, particularly service features in private branch exchanges, not only by entering sequences of digits in the conventional manner through a numeric keypad of a telephone station but also by voice input of words and/or digits through the microphone of the handset of the telephone station.

Further advantageous aspects of the invention are characterized in the appended claims.

BRIEF DESCRIPTION OF THE DRAWINGS

An embodiment of the invention will now be explained with reference to the accompanying drawings, in which.

DESCRIPTION OF THE PREFERRED EMBODIMENTS

Figure 1:
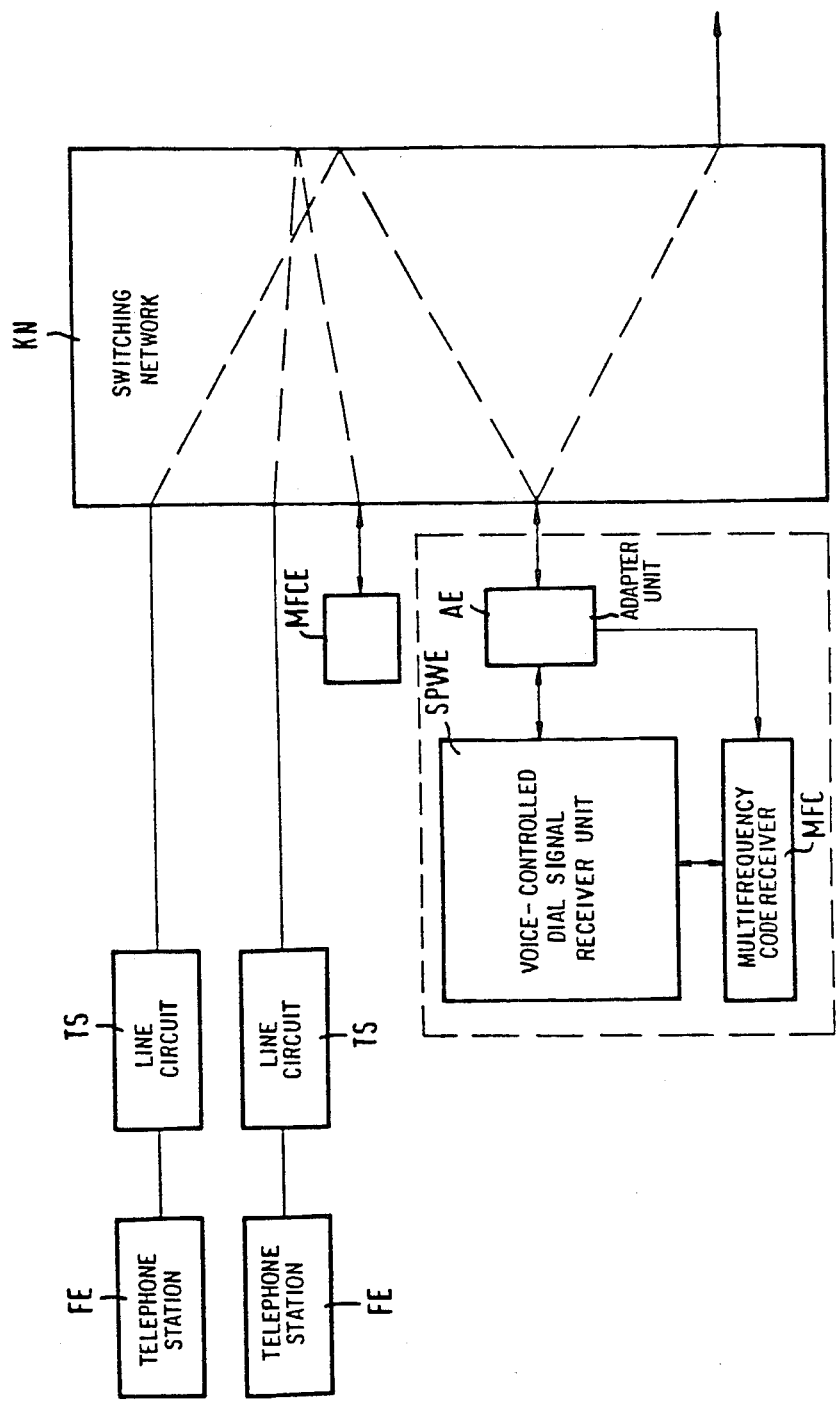
FIG. 1 is a schematic representation of a telephone switching system including a facility in accordance with the invention.

In the telephone switching system shown schematically in FIG. 1, telephone stations FE are connected to a switching network KN through line circuits TS. In the following, it is assumed that the telephone stations FE are equipped only with modern numeric keypads, and that multifrequency signalling is used.

When removing the handset of the telephone station FE, the subscriber is normally connected to one of several conventional multifrequency code receiver units MCFE via a switching network KN controlled by a switching control unit (not shown).

One of the multifrequency code receiver units MFCE is replaced by the facility according to the invention, which is bounded by a broken line in FIG. 1.

The facility according to the invention contains a voice-controlled dial signal receiver unit SPWE, which is connected to an adapter unit AE providing the interface to the switching network KN, and a multifrequency code receiver MFC, which is connected in parallel with the voice-controlled dial signal receiver unit SPWE to the adapter unit AE and serves to detect the sequences of digits entered through the numeric keypad of the telephone station FE.

Figure 2:
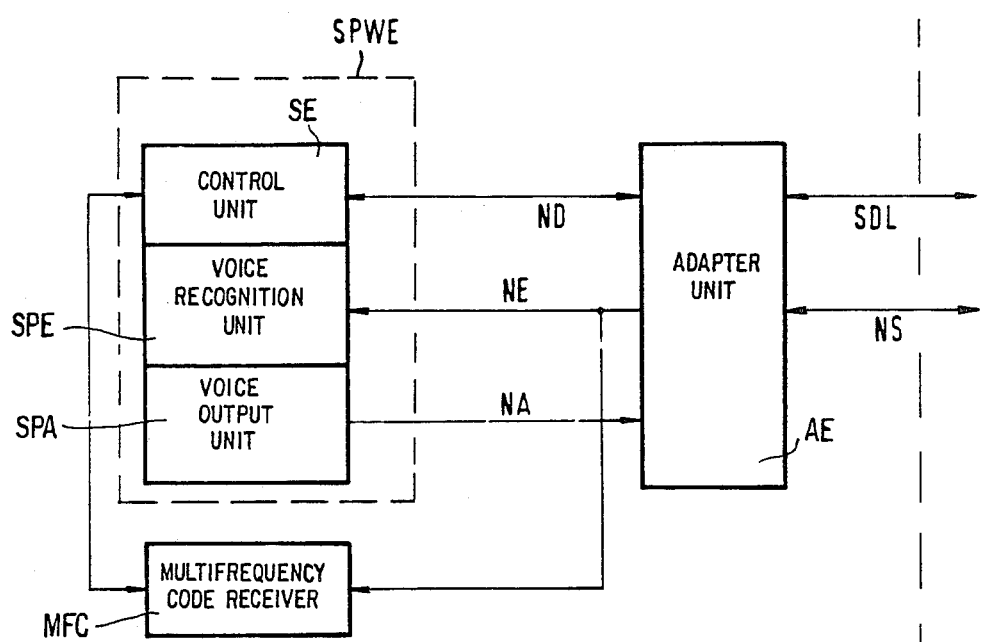
FIG. 2 is a block diagram of a facility in accordance with the invention.

As shown in FIG. 2, the voice-controlled dial signal receiver unit SPWE contains a voice recognition unit SPE, a voice output unit SPA, and a control unit SE. The voice recognition unit SPE, the control unit SE, and the voice output unit SPA are connected to the adapter unit AE by a first message path NE, a second message path ND, and a third message path NA, respectively. The adapter unit AE is connected to the switching network KN of the telephone switching system by a fourth message path NS and a control and data line SDL.

Through the microphone of the handset of the telephone station FE and/or through the numeric keypad of the station, the subscriber enters dial information and control information for activating service features of the telephone switching system.

This dial and control information consists, for example, of words representing
    names of companies or persons
    short codes
    service stations
    sequences of digits.

In a private branch exchange system, voice access can be gained to, e.g., the following service features:
    call forwarding
    camp-on busy
    do-not-disturb service.

In addition, voice access can be gained to data banks and information systems (e.g., control of a voice store-and-forward system) which are connected to the telephone switching system. It is also possible to combine voice input and keypad entry, in which case a voice input of the service feature (e.g., "call forwarding") is followed by the manual entry of the desired number.

To enable all subscribers to use such a voice-control facility, the acoustic patterns of the words and/or digits that can be entered by voice input, so-called reference-pattern data, are stored in a memory in the voice recognition unit SPE.

Lifting the handset of the telephone station FE activates, instead of the conventional multifrequency code receiver unit MFCE, the control unit SE of the voice-controlled dial signal receiver unit SPWE over the control and data line SDL to the adapter unit AE and over the second message path ND. In addition, the telephone station FE is connected to the adapter unit AE via the line circuit TS, the switching network KN, and the fourth message path NS to transmit speech and/or dial signals.

Instead of ringing and signalling equipment which would transmit a dial tone to the telephone station FE, a voice output unit SPA is included in the facility according to invention. The control unit SE, which is connected with the voice recognition unit SPE and the voice output unit SPA, controls the voice output unit SPA to provide voice prompts to the subscriber. To this end, the voice output unit SPA reads suitable acoustic commands in the form of speech, such as "please enter dial information", from an associated memory unit and transmits these commands over the second message path NA to the adapter unit AE, from which they are transmitted over the established path to the loudspeaker of the handset of the telephone station FE.

The voice output unit SPA may also be located in a central data processor of the telephone switching system.

The subscriber need no longer distinguish between the various tones, such as busy tone, ringing tone, etc., but receives, in a sort of "dialog mode", acoustic commands in the form of speech from the voice output unit SPA.

Dial or service-feature-control information is entered in the form of spoken words and/or spoken digits through the microphone of the handset. The voice signals are transmitted to the adapter unit AE and from there over the first message path NE to the voice recognition unit SPE, which is controlled by the control unit SE. In the voice recognition unit SPE, the words and/or digits are compared with the stored reference-pattern data and assigned to the most similar pattern. The memory-location number of the most similar reference pattern addresses the subscriber's name (the digits) or the service feature in an associated name memory of the voice recognition unit SPE.

The name memory is connected to a corresponding call number memory from which the number to be dialled is read. In a dial signal converter unit, the number is converted into control signals for initiating the dialling process. These signals are transmitted from the control unit SE over the second message path ND to the adapter unit AE and thence over the control and data line SDL to the switching control unit, which causes the path to be completed. In addition, the control unit SE causes the speech information recognized by the voice recognition unit SPE to be outputted to the subscriber as an acknowledgement.

At the end of the dialling process, the facility according to the invention is switched off like a conventional multifrequency code receiver unit MFCE.

If a voice input is not recognized by the voice recognition unit SPE, the subscriber is requested by an acoustic error message from the voice output unit SPA to repeat the entry.

Since a multifrequency code receiver MFC is connected to the control unit SE and, in parallel with the voice-controlled dial signal receiver unit SPWE by the first message path NE, to the adapter unit AE, as shown in FIG. 2, the facility according to the invention can also be used as a "transparent" multifrequency code receiver unit MFCE.

If a subscriber enters the desired number of the desired service feature through the numeric keyboard of the telephone station FE (also possible in combination with voice entry), the multifrequency code receiver MFC detects the transmitted dial signal. This is communicated to the control unit SE, whereby the voice recognition unit SPE is interrupted in its attempt to recognize the signal and restored to its initial state. The detected multifrequency signal is passed on by the control unit SE for connection setup as described above.

The facility according to the invention offers the advantage that central data processors of the telephone switching system, the switching network KN, and the control of the switching network need not be additionally loaded with software and hardware modifications. It suffices to replace the multifrequency code receiver unit MFCE by the facility according to the invention.

All message paths (NA, NE, ND, NS) can, of course, be designed to transmit either analog voice signals or digitized voice signals; for the latter, they must be implemented as time-division-multiplex buses.

We claim:

1. A facility for detecting and converting dial information and control information for service features of a telephone switching system, comprising:

a voice-controlled dial signal receiver unit including a voice recognition unit and a control unit;

a first message path and a second message path;

an adapter unit having means for interfacing to a switching network of the telephone switching system, respectively connected by said first message path and said second message path to said voice recognition unit and said control unit;

a multifrequency code receiver connected to said control unit and, in parallel with said voice-controlled dial signal receiver unit by said first message path, to said adapter unit;

a third message path; and a voice output unit, said voice output unit being disposable in the telephone switching system and connected with said control unit and said voice recognition unit and, by said third message path, to said adapter unit, said control unit being responsive to activation of said voice-controlled dial signal receiver unit by the telephone switching system to control said voice output unit to provide voice prompts to a subscriber and control said voice recognition unit to receive acoustic dial and control information and convert the acoustic dial and control information into a dial code;

said multifrequency code receiver comprising means for detecting dial and control information entered by a subscriber through a numeric keypad, said multifrequency code receiver and said control unit being responsive to dial or code information received by said multifrequency code receiver to interrupt said voice recognition unit through said control unit.

2. A facility for detecting and converting dial information and control information for service features of a telephone switching system, comprising:
- a voice-controlled dial signal receiver unit including a voice recognition unit and a control unit, said voice recognition unit comprising means for converting dial and code information to a dial code;
- a first message path and a second message path;
- an adapter unit having means for interfacing to a switching network of the telephone switching system, respectively connected by said first message path and said second message path to said voice recognition unit and said control unit;
- a multifrequency code receiver connected to said control unit and, in parallel with said voice-controlled dial signal receiver unit by said first message path, to said adapter unit;
- a third message path;
- means, including a control and data line connected to said adapter unit, for transmitting the dial code converted from dial and code information from said voice recognition unit to the telephone switching system;
- a voice output unit connected with said control unit and said voice recognition unit and, by said third message path, to said adapter unit, said voice-controlled dial signal receiver unit being activatable and deactivatable by the telephone switching system through said control and data line, said control unit being responsive to activation of said voice-controlled dial signal receiver unit by the telephone switching system to control said voice output unit to provide voice prompts to a subscriber and control said voice recognition unit to receive the acoustic dial and control information and convert the acoustic dial and control information into the dial code;
- a fourth message path, connected to said adapter unit, for connecting said adapter unit to the switching network; and
- means, including a line circuit connected to said switching network, for connecting a telephone station to said adapter unit through said line circuit, the switching network and said fourth message path with said fourth message path connecting said adapter to the switching network.

3. A facility as claimed in claim 2, characterized in that said voice-controlled dial signal receiver unit is connectable to data banks or information systems connected to the telephone switching system.

4. A facility as claimed in claim 3, characterized in that said first, second, third and fourth message paths are time-division-multiplex lines, so that the dial and control information is transmitted in digitized form.

* * * * *